Patented Sept. 14, 1926.

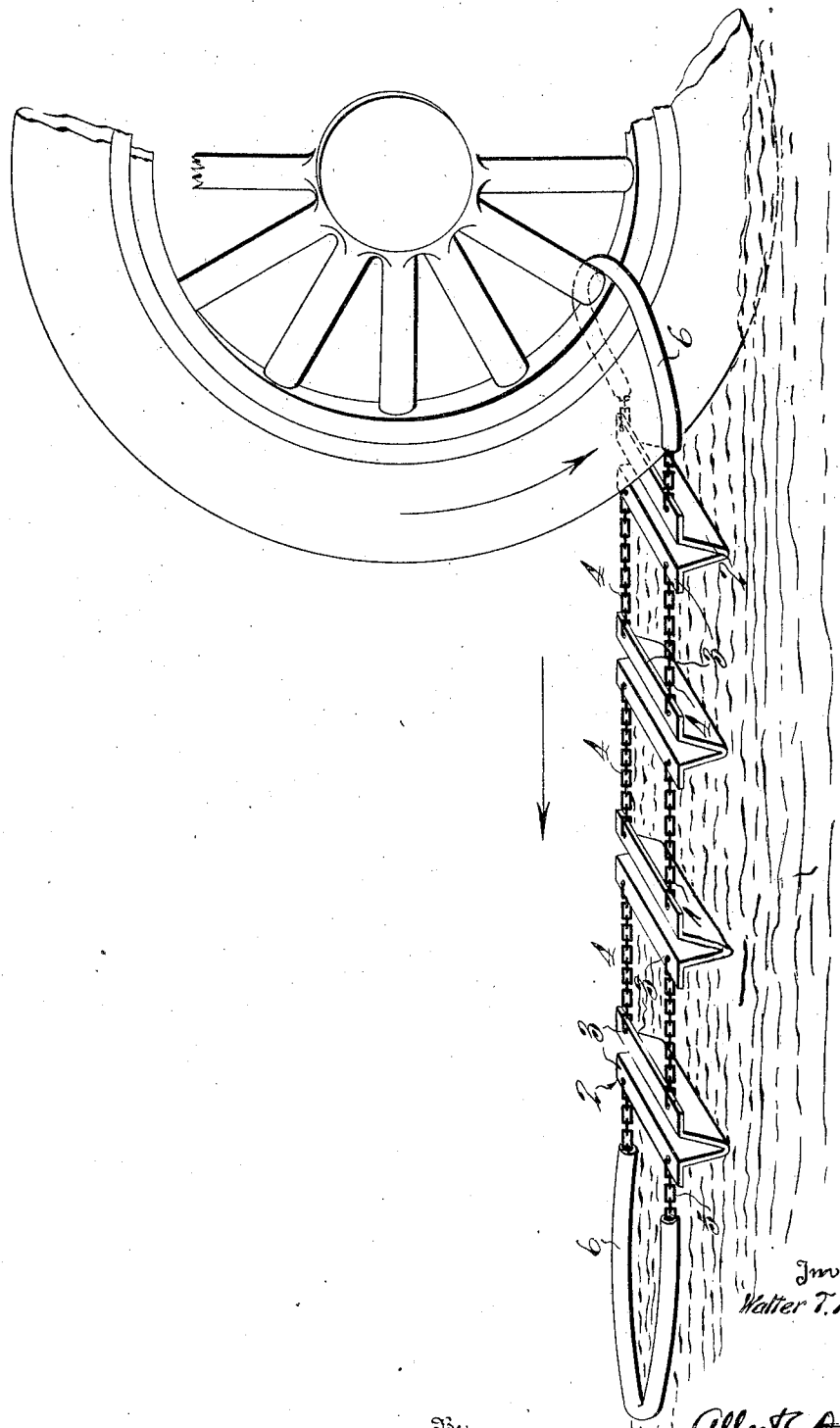

1,599,583

UNITED STATES PATENT OFFICE.

WALTER T. NEWMAN, OF VANCOUVER, CANADA.

DRAG CHAIN FOR AUTOMOBILE WHEELS.

Application filed June 11, 1925. Serial No. 36,515.

This invention relates to a drag chain that will enable a self-propelled vehicle to drive out of mud or soft ground in which one or both of its driving wheels may have sunk.

The device constitutes a chain-connected series of members extending across the width of the tire and adapted to be removably connected at one end to the "mired" wheel and be laid along the path of the same in moving out.

The invention is fully described in the following specification, reference being made to the drawing by which it is accompanied, which represents the device in perspective, showing the manner of its connection to a 'mired" wheel.

In this drawing 2 represents a member, preferably bent from sheet metal of suitable thickness to a V-shape with flanges 3 at the upper ends of the V. Four or more of these members 2, 3 are secured together by parallel chains 4 between the flanges and at each end chains 5 form a loop sufficient to pass around the rim and tire of the wheel adjacent one of the spokes.

To protect the paint or enamel of the wheel from injury by the chain, that portion of it that comes in contact with the wheel is encased in a rubber tube, as at 6.

If one or the other of the driving wheels of a car have sunk in soft ground, in which they slip and from which, therefore, the wheels are unable to withdraw themselves, one of the loops 5 of the chain 2, 3, 4 is connected round the wheel rim and tire somewhat as shown in the drawing, and the chain is extended on the ground from the wheel in the direction of the wheel's movement, as indicated by the arrows.

As the wheel rotates, the chain is drawn into the soft ground until it obtains a sufficient hold therein, when the wheel rolls up the chain out of the hole.

Where both driving wheels of the vehicle are in the soft ground, the chains may be divided at the midlength and half applied to each wheel. It is for this requirement that a loop 5 is provided at each end of the chain.

The provision is simple and inexpensive, convenient to carry, and is thoroughly effective in serving the purpose for which it is designed.

I am aware that skid chains have been provided in a variety of forms having projections that afford the wheels a driving hold in soft ground, but such require to be applied to the wheel before it gets into soft ground and cannot be applied when mired. They do not, therefore, conflict with the device as set forth in the foregoing description in that they are not adapted to have one end secured to a wheel when in the mud and therefore provide a non-slipping brake along which it may travel out.

Having now particularly described my invention, I hereby declare that what I claim as new and desire to be protected in by Letters Patent, is:

A device of the class described, comprising a series of members bent from sheet metal to a substantially V-shape with outwardly turned flanges at the free ends of the V, chains connecting the flanges of these members together with the V projections transverse of the chains, and means for connecting the ends of the series around the rim and tire of a wheel, said flanges lying in a common plane parallel to the edge of the V whereby when the device is in use said flanges will lie normal to the radius of a wheel passing over the same.

In witness whereof I affix my signature.

WALTER T. NEWMAN.